US006170041B1

(12) United States Patent
LeVasseur et al.

(10) Patent No.: US 6,170,041 B1
(45) Date of Patent: Jan. 2, 2001

(54) INTEGRATED CIRCUIT MEMORY WITH A BUS TRANSCEIVER

(75) Inventors: Jamie Joseph LeVasseur, Vancouver, WA (US); Joseph E. Herbst, Milpitas, CA (US)

(73) Assignee: Integrated Silicon Soulution, Inc., Santa Clara, CA (US)

( * ) Notice: Under 35 U.S.C. 154(b), the term of this patent shall be extended for 0 days.

(21) Appl. No.: 09/160,499

(22) Filed: Sep. 24, 1998

(51) Int. Cl.[7] .............................. G06F 12/00; G06F 13/00

(52) U.S. Cl. .......................... 711/149; 711/100; 711/104; 711/131; 711/154

(58) Field of Search .................................... 711/100, 104, 711/131, 149, 154, 167, 168

(56) References Cited

U.S. PATENT DOCUMENTS

| | | | | |
|---|---|---|---|---|
| 4,967,375 | * | 10/1990 | Pelham et al. | 395/515 |
| 5,469,549 | * | 11/1995 | Simpson et al. | 709/213 |
| 5,511,179 | * | 4/1996 | Chai-I | 711/149 |
| 5,515,523 | * | 5/1996 | Kalkunte et al. | 711/149 |
| 5,659,718 | * | 8/1997 | Osman et al. | 713/400 |
| 5,682,498 | * | 10/1997 | Harness | 711/106 |
| 5,713,039 | * | 1/1998 | Tran | 712/23 |
| 5,784,636 | * | 7/1998 | Rupp | 712/37 |
| 5,890,199 | * | 3/1999 | Downs | 711/106 |
| 5,897,654 | * | 4/1999 | Eisen et al. | 711/131 |
| 5,956,748 | * | 9/1999 | New | 711/149 |

* cited by examiner

*Primary Examiner*—Tuan V. Thai
(74) *Attorney, Agent, or Firm*—Pennie & Edmonds LLP

(57) ABSTRACT

A two port high speed integrated circuit memory device that includes a bus transceiver, a memory array and a decoder. The present invention provides a processor high speed access to the internal memory array via very low capacitive load address and data buses. The present invention also buffers a secondary bus to provide access to slower-speed local devices. The bus transceiver transfers address, data and control signals between the primary and secondary port and also couples signals to the internal memory array. The bus transceiver includes an input data bus, an output data bus, and an address and control bus. Each of these separate buses include a buffer at the primary and secondary port to minimize capacitive loading. The decoder in the two port memory device decodes memory chip select signals and control signals that define the operational mode of the device. To save power the present invention provides an operational mode in which primary bus signals are not reflected to the secondary bus unless the internal memory array is not selected by the chip selects. In an enhanced mode the two port memory device includes a ready signal generator feature, and chip select lines are converted into additional address input lines.

22 Claims, 8 Drawing Sheets

| CSI | MODE | | | | | | | $\overline{CSMEM}$ | | | | | |
|---|---|---|---|---|---|---|---|---|---|---|---|---|---|
| | [6] | [5] | [4] | [3] | [2] | [1] | [0] | [5] | [4] | [3] | [2] | [1] | [0] |
| PSL, PSU | 0 | 0 | X | 0 | 0 | 0 | 0 | ISU | ISU | DSU | DSL | | |
| PSL, PSU | 1 | 0 | X | 0 | 0 | 0 | 0 | ISU | ISL, ISU | DSU | DSL | | |
| PSL, PSU | 0 | 1 | X | 0 | 0 | 0 | 0 | ISU | ISL | DSU | DSU, DSL | | |
| PSL, PSU | 1 | 1 | X | 0 | 0 | 0 | 0 | ISU | ISL, ISU | DSU | DSU, DSL | | |
| PSL, DSL | 0 | X | X | 0 | 0 | 0 | 1 | ISU | ISL | DSU | | PSU | |
| PSL, DSL | 1 | X | X | 0 | 0 | 0 | 1 | ISU | ISL, ISU | DSU | | PSU | |
| PSL, DSU | 0 | X | X | 0 | 0 | 1 | 0 | ISU | ISL | | DSL | PSU | |
| PSL, DSU | 1 | X | X | 0 | 0 | 1 | 0 | ISU | ISL, ISU | | DSL | PSU | |
| PSL, ISL | X | 0 | X | 0 | 0 | 1 | 1 | ISU | | DSU | DSL | PSU | |
| PSL, ISL | X | 1 | X | 0 | 0 | 1 | 1 | ISU | | DSU | DSU, DSL | PSU | |
| PSL, ISU | X | 0 | X | 0 | 1 | 0 | 0 | | ISL | DSU | DSU, DSL | PSU | |
| PSL, ISU | X | 1 | X | 0 | 1 | 0 | 0 | | ISL | DSU | DSL | PSU | |
| PSU, DSL | 0 | X | X | 0 | 1 | 0 | 1 | ISU | ISL | DSU | | | PSL |
| PSU, DSL | 1 | X | X | 0 | 1 | 0 | 1 | ISU | ISL, ISU | DSU | | | PSL |
| PSU, DSU | 0 | X | X | 0 | 1 | 1 | 0 | ISU | ISL | | DSL | | PSL |
| PSU, DSU | 1 | X | X | 0 | 1 | 1 | 0 | ISU | ISL, ISU | | DSL | | PSL |
| PSU, ISL | X | 0 | X | 0 | 1 | 1 | 1 | ISU | | DSU | DSU, DSL | | PSL |
| PSU, ISL | X | 1 | X | 0 | 1 | 1 | 1 | ISU | | DSU | DSL | | PSL |
| PSU, ISU | X | 0 | X | 1 | 0 | 0 | 0 | | ISL | DSU | DSL | | PSL |
| PSU, ISU | X | 1 | X | 1 | 0 | 0 | 0 | | ISL | DSU | DSU, DSL | | PSL |
| DSL, DSU | 0 | X | 0 | 1 | 0 | 0 | 1 | ISU | ISL | | | PSU | PSL |
| DSL, DSU | 1 | X | 0 | 1 | 0 | 0 | 1 | ISU | ISL, ISU | | | PSU | PSL |

FIG. 5A

| CSI | MODE | | | | | | | $\overline{CSMEM}$ | | | | | |
|---|---|---|---|---|---|---|---|---|---|---|---|---|---|
| | [6] | [5] | [4] | [3] | [2] | [1] | [0] | [5] | [4] | [3] | [2] | [1] | [0] |
| DSL, DSU | 0 | X | 1 | 1 | 0 | 0 | 1 | ISU | ISU | | | PSU | PSL, PSU |
| DSL, DSU | 1 | X | 1 | 1 | 0 | 0 | 1 | ISU | ISL, ISU | | | PSU | PSL, PSU |
| DSL, ISL | X | X | 0 | 1 | 0 | 1 | 0 | ISU | | DSU | | | PSL |
| DSL, ISL | X | X | 1 | 1 | 0 | 1 | 0 | ISU | | DSU | | | PSL, PSU |
| DSL, ISU | X | X | 0 | 1 | 0 | 1 | 1 | | ISL | DSU | | | PSL |
| DSL, ISU | X | X | 1 | 1 | 0 | 1 | 1 | | ISL | DSU | | | PSL, PSU |
| DSU, ISL | X | X | 0 | 1 | 1 | 0 | 0 | ISU | | | DSL | | PSL |
| DSU, ISL | X | X | 1 | 1 | 1 | 0 | 0 | ISU | | | DSL | | PSL, PSU |
| DSU, ISU | X | X | 0 | 1 | 1 | 0 | 1 | | ISL | | DSL | | PSL |
| DSU, ISU | X | X | 1 | 1 | 1 | 0 | 1 | | ISL | | DSL | | PSL, PSU |
| ISL, ISU | X | 0 | 0 | 1 | 1 | 1 | 0 | | | DSU | DSL | PSU | PSL |
| ISL, ISU | X | 1 | 0 | 1 | 1 | 1 | 0 | | | DSU | DSU, DSL | PSU | PSL |
| ISL, ISU | X | 0 | 1 | 1 | 1 | 1 | 0 | | | DSU | DSL | PSU | PSL, PSU |
| ISL, ISU | X | 1 | 1 | 1 | 1 | 1 | 0 | | | DSU | DSU, DSL | PSU | PSL, PSU |

FIG. 5B

INTEGRATED CIRCUIT MEMORY WITH A BUS TRANSCEIVER

The present invention relates generally to integrated circuit memory devices, and more particularly to two port integrated circuit memory devices that broadcast signals received at one port to the second port.

BACKGROUND OF THE INVENTION

A conventional computer system, as illustrated in FIG. 1, includes at least one processor, one or more random access memory (RAM) arrays, read only memory (ROM), a non-volatile memory such as a flash memory, and a custom logic device (ASIC). These components are coupled together by a system bus. As the operating frequencies of processors has increased, the high capacitive loading of system buses have made them a bottleneck in system performance. For example, in a typical system the difference between a 75 pF load on a bus and a 15 pF load on a bus is about 1.25 ns. If the cycle time of the processor is 10 ns, then this represents over 10% of the cycle time. The capacitive loading thereby reduces the access time available to access devices in a clock cycle and therefore may require additional wait-states to be used to access external memory. Large capacitive loading may also require using faster, more expensive devices to meet desired system performance requirements. Large capacitive loading and faster external devices also increase the power consumption of the system.

One conventional approach to reducing bus capacitance and increasing system clock rates is to split the system bus into two or more buffered component buses. The capacitance of each individual bus is thereby reduced allowing the use of higher bus clock rates. However, each buffer stage in the bus introduces delays, which typically requires wait states to be added for accessing devices. A further source of delay in conventional systems is that each time a signal must be communicated from one integrated circuit chip to another, typically a wait state must be added.

An object of the present invention is to overcome these and other problems of the prior art so as to provide high speed access to a memory array while supporting reduced speed access to other slower devices.

SUMMARY OF THE INVENTION

In summary, the present invention is a two port high speed integrated circuit memory device that includes a bus transceiver, a memory array and a decoder. The present invention provides a processor high speed access to an internal memory array via very low capacitive load address and data buses. The present invention also buffers a secondary bus to provide access to slower-speed local devices. The bus transceiver transfers address, data and control signals between the primary and secondary port and also couples signals to the internal memory array. In one embodiment signals are coupled from the primary or secondary port to the internal memory array within the current clock cycle so as to provide no wait state performance up to 133 MHz. The bus transceiver includes an input data bus, an output data bus, and an address and control bus. Each of these separate buses include a buffer at the primary and secondary port to minimize capacitive loading. The roles of the primary and secondary bus can be reversed in most modes of operation.

The decoder in the two port memory device decodes memory chip select signals and control signals that define the operational mode of the device. In one system configuration, there are three address spaces: program space, data space, and I/O space. Each of these address spaces further includes an upper and a lower section. In one embodiment, two of these address space sections can be mapped to the internal memory array and the other four are mapped to external memory. Access to these address spaces is controlled by the chip select signals decoded by the decoder. When the lower halves of two address spaces or the upper halves of two address spaces are mapped into the internal memory array, the most significant address line is inverted for addresses to one of the address spaces to distinguish addresses for the two memory spaces. Further, to save power the present invention provides an operational mode in which primary bus signals are not reflected to the secondary bus unless the internal memory array is not selected by the chip selects.

In an enhanced mode the two port memory device includes a ready signal generator feature. Also, in the enhanced mode chip select lines are converted into additional address input lines. An output enable control pin is converted into a clock input, and a write enable pin is converted into a ready signal output. The delay between a clock start strobe signal and the ready signal is programmable by writing to internal registers. Generating the ready signal in the two port memory device avoids the need to insert any wait states for transferring signals to an external logic chip to provide ready signals.

BRIEF DESCRIPTION OF THE DRAWINGS

Additional objects and features of the invention will be more readily apparent from the following detailed description and appended claims when taken in conjunction with the drawings, in which:

FIGS. 5A and 5B illustrate a memory space decode table according to an embodiment of the present invention.

DESCRIPTION OF THE PREFERRED EMBODIMENTS

Figure 2:
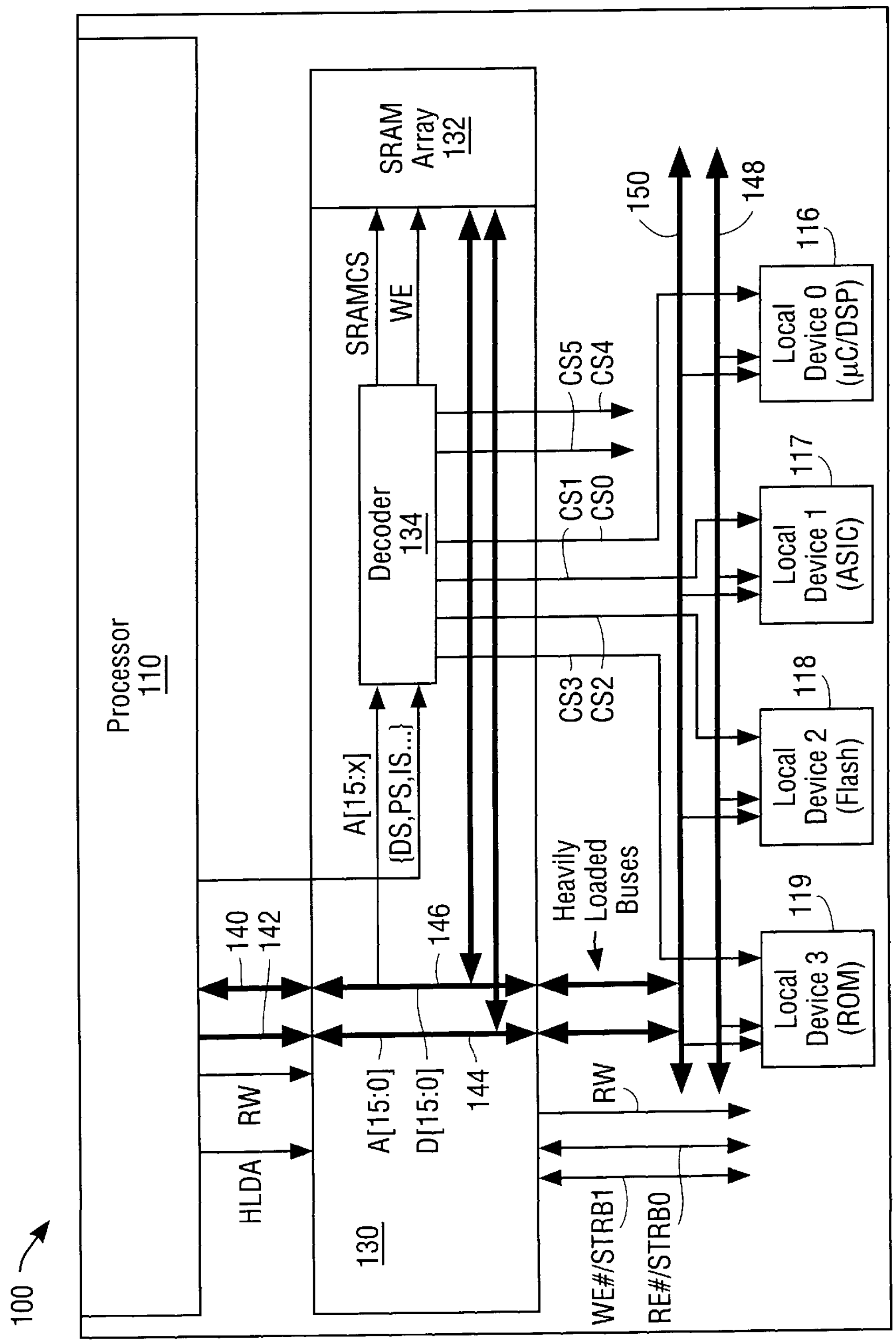
FIG. 2 illustrates a two processor system that includes a two port SRAM according to an embodiment of the present invention.

Referring to FIG. 2, there is shown a system 100 that includes an integrated circuit memory with a bus transceiver according to an embodiment of the present invention. The system includes a processor 110 that is coupled by a data bus, an address bus and control lines to the primary port of the integrated circuit memory 130. In one embodiment, the integrated circuit memory with a bus transceiver is a two port SRAM, and processor 110 is either a digital signal processor (DSP) or micro-controller ($\mu$C). The secondary port of SRAM 130 is coupled to address and data buses 148, 150, which may be heavily loaded. Buses 148 and 150 couple SRAM 130 to the other local devices 116–119. In the example illustrated in FIG. 2, the local devices comprise a second DSP or $\mu$C 116, an ASIC 117, a flash memory 118, and a ROM 119. SRAM 130 is bi-directional in that processors can be coupled to the primary port, the secondary port or both. In most of the operational modes the operation of the two ports is symmetrical.

SRAM 130 includes a decoder 134 and an SRAM array 132. Decoder 134 receives addresses from processor 110 via buses 142 and 144, as well as control signals. Based on these inputs decoder 134 generates chip select signals for SRAM array 132, and for local devices 116–119. In other system configurations, decoder 134 can also provide access to additional devices coupled to the primary port. In a preferred embodiment, SRAM array 132 is accessed from only one of the two ports at a time.

The primary port of SRAM 130 is connected directly to processor 110 for high speed point to point zero wait state accesses to SRAM array 132 while maintaining a seamless connection to the additional memory and peripherals on the more heavily loaded greater than zero wait state secondary port of SRAM 130. This is accomplished without additional components and without the need to modify existing secondary port devices because all signals provided by processor 110 to the primary port are buffered and transmitted to the secondary port unchanged with only a minor delay. The present invention thereby isolates and buffers the primary high speed bus 140, 142 from the slower secondary local devices 116–119, to provide the high speed of using a single SRAM with the flexibility and extended memory capacity of a system having several external local devices.

The present invention simplifies processor system design and layout. In one embodiment, the present invention provides no wait state performance up to 133 MHz. The present invention combines a high performance, single ported memory array with two ported interface logic to enable maximum performance and flexibility while minimizing cost.

In one operating mode, SRAM 130 broadcasts to the secondary port bus signals received at the primary port from processor 110. This permits the use of existing system solutions to be used with new generations of higher frequency processors 110. SRAM 130 provides a zero wait state interface between processor 110 and memory array 132. Furthermore, SRAM 130 avoids the need for additional "glue logic" to interface to local devices 116–119. The devices coupled to the secondary bus 148, 150 see a "virtual" processor bus that enables the devices to arbitrate and access the memory array 132 in a conventional manner. SRAM 130 can also be used as a local or global memory for a two processor system. Chip select logic on each port allows the same data to be accessed at different locations in memory if desired.

Figure 3:
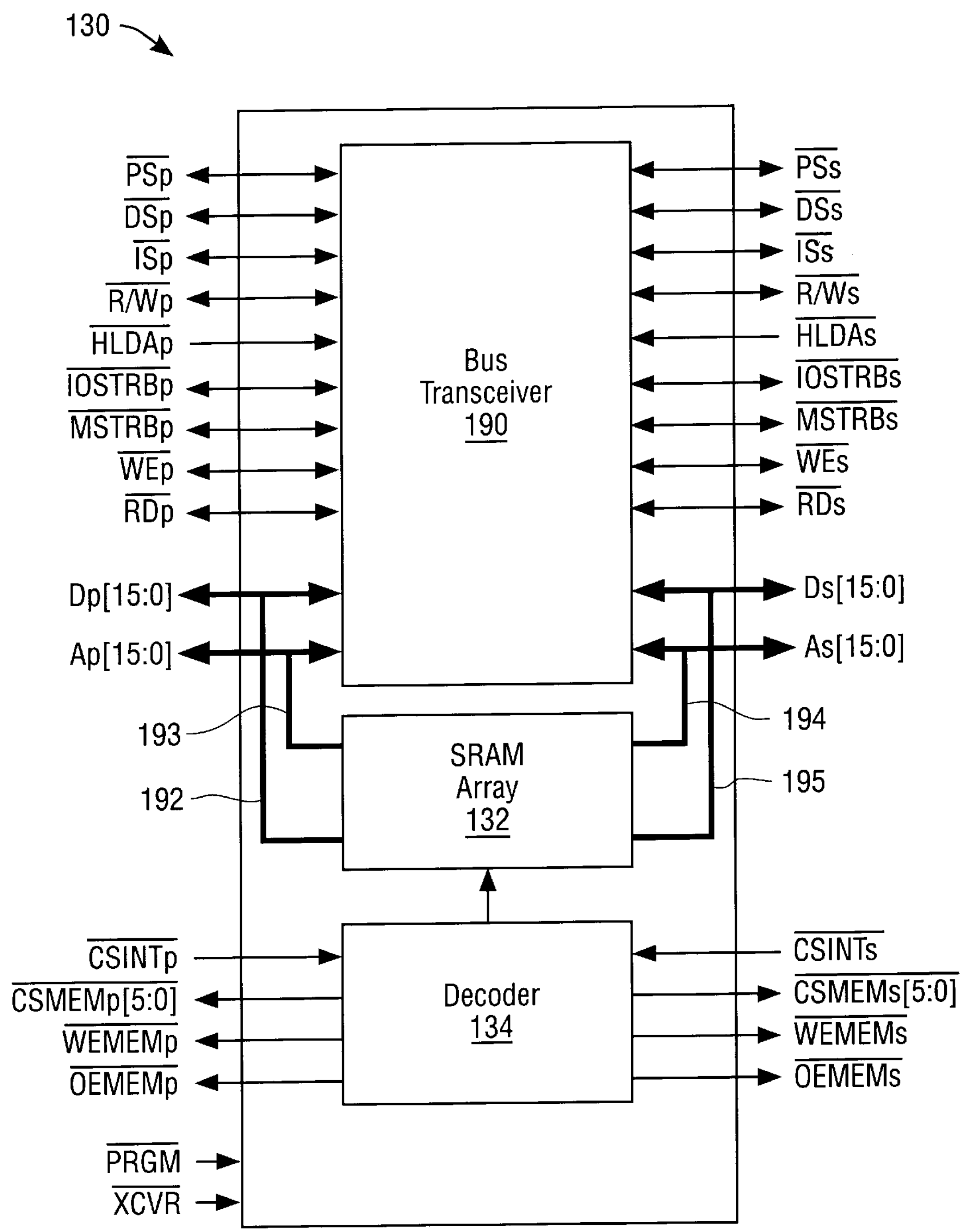
FIG. 3 illustrates a block diagram of a two port SRAM according to an embodiment of the present invention.

Referring to FIG. 3, there is shown a block diagram of an SRAM 130. SRAM 130 is an asynchronous device comprised of a bus transceiver unit 190, an SRAM array 132, and a decoder 134. Bus transceiver 190 is bi-directional. Each of the seven pins at the primary port (identified with a "p" suffix) has a corresponding pin at the secondary port (identified with an "s" suffix).

SRAM 130 has several operational modes. In transceiver mode, bus transceiver 190 broadcasts signals received at the primary port to the secondary port and broadcasts signals received at the secondary port to the primary port, however decoder 134 is effectively disabled and thus there is no access to internal SRAM array 132 in transceiver mode. Asserting the XCVR__pin, shown in FIG. 3, puts SRAM 130 into transceiver mode. Note that, as used herein, an underscore at the end of a signal name is equivalent to a bar over the signal name, and indicates an inverted signal.

In primary remote mode, signals are broadcast from the primary port to the secondary port and access is provided to internal SRAM 132. In secondary remote mode, signals are broadcast from the secondary port to the primary port. In these remote modes all of the address, control, and data signals are transferred between the two ports. If a memory access does not hit the internal SRAM array 132 memory space, then the appropriate CSMEM chip select signals are generated by decoder 134 to access an external memory. To save power the present invention also provides a programmable operational mode in which primary bus signals are not reflected to the secondary bus unless the SRAM is not selected by the chip selects (CSINTp__, CSINTs__). In this mode the SRAM 130 performs as a standard fast SRAM. In one embodiment, this feature alone provides ½ Watt of power savings with a processor operating at 133 MHz.

SRAM 130 is programmed by asserting the PRGM__pin and coupling instruction signals to the As address port. In one embodiment, instruction signals are provided using pull-ups and pull-downs. In a further embodiment, an ASIC is used to program SRAM 130 during operation of the system. In this embodiment, the address space of blocks of data up to the size of the internal SRAM array 132 can be effectively moved in memory by re-defining the address space of the SRAM array 132. For example, by programming the SRAM array 132 memory space as program space, then in a subsequent clock cycle programming the SRAM array 132 memory space as data space. In some systems, program code may be moved to data space, modified, and then moved back to program space.

In one embodiment, SRAM array 132 is a 64K×16 memory array. This embodiment can be used with a conventional DSP system that uses two 32K×16 program space regions, two 32K×16 data space regions, and two 32K×16 I/O space regions. For example, the present invention can be used in DSP systems based on the TMS320LC5× or TMS320LC54×DSPs from Texas Instruments. In such systems, each SRAM array 132 can be used as two of these six 32 KB regions. The program space signal pin (PSp__) indicates processor 110 is communicating with program space memory. The data space signal pin (DSp__) indicates processor 110 is communicating with data space memory. Similarly the I/O space signal pin (ISp__) indicates processor 110 is communicating with I/O space memory. In a system with a second processor coupled to the secondary port the corresponding secondary port pins PSs__, DSs__, and ISs__ perform the corresponding functions for the second processor. The SRAM 130 can also be programmed to map any or all of the six memory regions to external memory arrays.

In systems where the lower halves of two address spaces or the upper halves of two address spaces are mapped into SRAM array 132, address line A15 is inverted for addresses to one of the address spaces to distinguish addresses for the two memory spaces. A15 is inverted internally by the transceiver. For example, in one mode a program space lower (PSL) memory section is mapped to the upper half of SRAM array 132, and a data space lower (DSL) memory section is mapped to the lower half of SRAM array 132. Accesses to program space are identified by asserting the PSp__signal. Similarly, accesses to data space are indicated by asserting the DSp__signal. The address provided by processor 110 to access program space or data space may be exactly the same. Therefore, in this example, when the PSp__ signal is asserted, indicating an access to program space, the A15 address line is inverted by the transceiver from a zero to a one, so that the upper half of SRAM array 132, which is the PSL memory section, is accessed. In this manner, any two of the six memory sections can be mapped into SRAM array 132.

The hold acknowledge signals (HLDAp__, HLDAs__) are provided by the corresponding processor to the SRAM 130 and indicate that the processor is in a hold state. When a processor is placed in a hold state the address lines (Ap, As) and data lines (Dp, Ds) for the corresponding port are tri-stated by the processor. Asserting the hold signal for a port places the port into a receiver mode. The hold acknowledge signals thereby control the flow of signals across the SRAM. When a processor's address and data lines are tri-stated, the HLDA signal for the processor is low. This indicates to the bus transceiver 190 that it can drive the control signals on the bus and will optionally drive the bus. The Dp and Ds drive signals are based upon the R/W signal for the controlling port. For example, if the primary port HLDAp__ is high (indicating that the processor is driving) and HLDAs__ is low (indicating that the secondary bus is tri-stated by all devices on that bus other than the transceiver) then the control signal values from the primary port are provided to the secondary port. If R/W__p is high then the Ds values are provided to the Dp bus (a read signal flows in the opposite direction of control signals). If R/W__p is low then the Dp bus values are provided to the Ds bus (write signals flow in the same direction as control signals).

The read/write signals (R/W__p, R/W__s) indicate the transfer direction during communication with a processor. For example, when the primary port is placed in a write mode, signals arriving at the primary port are inputs and signals provided to the secondary port are outputs.

The memory strobe signals (MSTRBp__, MSTRBs__) indicate bus access to data or program memory. Similarly, the I/O strobe signals (IOSTRBp__, lOSTRBs__) indicate bus access to I/O devices. The read strobe signals (RDp__, RDs__) indicate a read request from a processor. The write strobe signals (WEp__, WEs__) indicate a write strobe from a processor. Depending on the type of memory controller used in the computer system, either the RD and WE control signals, or the R/W control signals are used to identify read operations and write operations. The combination of these four signals for each port are decoded by decoder 134, which generates the appropriate external memory chip select signals (CSMEMp__[5:0], CSMEMs__[5:0]), external memory write enable signals (WEMEMp__, WEMEMs__) and external memory output enable signals (OEMEMp__, OEMEMs__). Decoding the input signals in the SRAM 130 provides significant performance improvements over conventional systems that decode the signals using external glue logic, such as a separate programmable array logic (PAL) device. Accessing external glue logic typically requires inserting a wait state.

Figure 4:
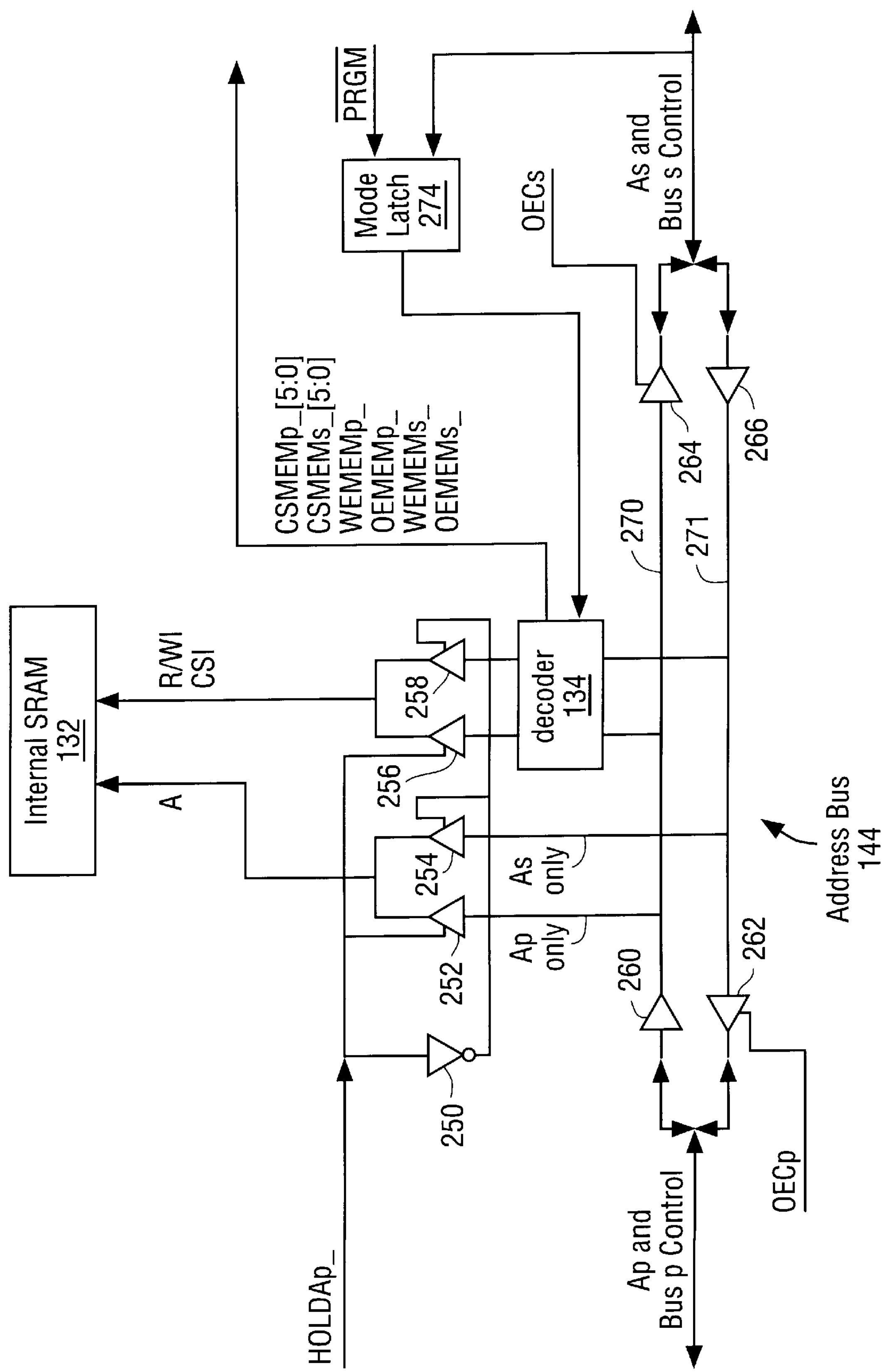
FIG. 4 illustrates the address bus and control path of a two port SRAM according to an embodiment of the present invention.

Referring to FIG. 4, there is shown a diagram of the address bus and control path of a two port SRAM according to one embodiment of the present invention. The address bus 144 is split into two uni-directional buffered buses 270 and 271. Bus 270 couples address and control signals from the primary port (Ap and Bus p Control) to the secondary port (As and Bus s Control). Bus 271 transfers signals in the opposite direction. SRAM array 132 is coupled to each of these buses. Signals are therefore provided from one port to the other, and from the input port to the internal SRAM array 132. This provides high speed zero wait state access to the memory array, while isolating the large capacitive loading of slower local devices on the secondary port. Addresses from the primary port are coupled via buffer 252 to the internal SRAM array 132, and secondary port addresses are coupled via buffer 254. Decoder 134 reads the control logic signals from buses 270 and 271 and determines the type of operation and whether the address accesses the internal SRAM array 132 or one of the other system components. Decoder 134 then generates the appropriate signals to access the specified component and places the component in either a read or a write mode. For example, to write data from processor 110 to flash memory 118 on the secondary bus, processor 110 asserts the DSp__ signal. Decoder 134 then generates the appropriate CSMEMs__ signal to select and place flash memory 118 into a write mode, and the corresponding data are coupled through SRAM 130 to flash memory 118.

Whether signals are transmitted from a port is determined by the state of the corresponding hold acknowledge signal and the state of the corresponding remote mode bit stored in mode latch 274, shown in FIG. 4. Mode latch 274 includes a latch for each of the sixteen address lines As[15:0]. The value stored in each of these latches is referred to as a mode bit. The mode bits are set when SRAM 130 is programmed. The Secondary Address Bus As[15:0] are sampled on the rising edge of PRGM__ and the values are latched in mode latch 274. The mode bits corresponding to As[15:8] form a primary mode register, MODEp[7:0]. The mode bits corresponding to As[7:0] form a secondary mode register, MODEs[7:0]. When the primary bus is the bus master, MODEp[7] controls whether signals are broadcast to the secondary port. When the secondary bus is the bus master, MODEs[7] controls whether signals are broadcast to the primary port.

The remote mode bit for the corresponding port, either MODEp[7] or MODEs[7], is deasserted to place the device into non-remote mode which is a power saving mode. In non-remote mode no signals are broadcast to the opposing port, however, the chip selects still function. For example, if the primary port is the bus master, then in non-remote mode no signals are broadcast to the secondary port. Non-remote mode keeps the opposing bus from driving the capacitive loads, thereby reducing power. If an address request is received that does not map into the internal SRAM array 132 memory space, then the CSMEM signals can be used to access an external memory on the bus master port. For example with the primary bus being the bus master, in a system with an external memory on the primary bus, if there is a miss, the invention reflects the decode signals onto the CSMEMp signals to perform the decode function and access the appropriate external memory. Non-remote mode can also be used in system configurations where there is a DSP on the primary side and the secondary side, each with its own dedicated memory. In such systems non-remote mode prevents contention for the external memories by the two DSP's.

The control of the memory space mapping by the MODEp and MODEs registers in mode latch 274 is illustrated in the memory space decode table shown in FIGS. 5A and 5B. The relationship between the MODEP register settings and the CSMEMp signals, is the same as the relationship between the MODEs register settings and the CSMEMs signals. Therefore in the table the MODE register describes both the MODEp and MODEs registers, and the CSMEM lines describe both the CSMEMp and CSMEMs lines. The MODEp register controls the memory mapping when the primary bus is the bus master. The MODEs register controls the memory mapping when the secondary bus is the bus master. The MODE register can be divided into upper mode bits MODE[6:4] and lower mode bits MODE[3:0]. The upper mode bits, MODE[6:4], control whether the CSMEM [5:0] signals operate in a 64K or 32K mode. Each of the CSMEM signals 0, 2 and 4 can be coupled to either a 32K or 64K section of memory. In 64K mode one of the two chip selects for an address space is always asserted when that address space is accessed. For example, when MODE[6] is asserted this indicates the 64K I/O space is in one 64K memory section. This is shown in the second row of the table in FIG. 5A, by the I/O Space Lower ("ISL") and I/O Space Upper ("ISU") designations in the corresponding CSMEM [4] entry. In this mode, CSMEM[4] is always asserted when the I/O memory space is accessed. Similarly, MODE[5] controls whether data space is accessed as a single 64K section of memory by CSMEM[2] or two 32K sections of memory by CSMEM[2] and CSMEM[3]. Lastly, MODE[4] controls whether program space is accessed in a 64K or 32K chip select mode.

The lower MODE[3:0] register bits determine which two of the six memories spaces comprising the upper and lower sections of the program space, data space, and I/O space are mapped into the two memory sections of the internal SRAM 132. The remaining four memory spaces are mapped into external memories which are controlled by the CSMEM lines as shown in FIGS. 5A and 5B. For example, in the first row of the table in FIG. 5A, program space lower ("PSL") and program space upper ("PSU") memory spaces are mapped into the internal SRAM array 132 as indicated by the first column in the table. Access to the PSL and PSU memory spaces is controlled by the chip select internal ("CSI") signal, shown in FIG. 4. The R/WI signal input to the SRAM 132 shown in FIG. 4 indicates whether a memory access is a read or a write operation.

Figure 6:
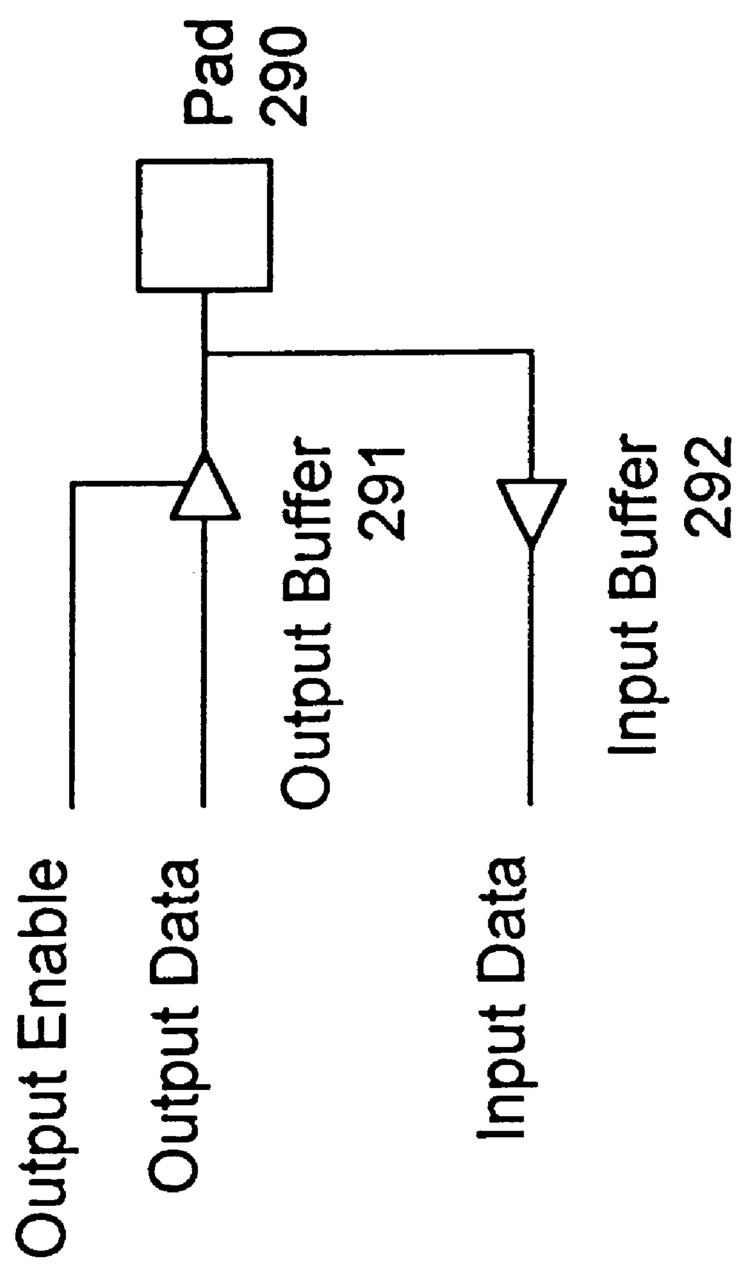
FIG. 6 illustrates a tri-state I/O pad according to an embodiment of the present invention.

Address and control signals are coupled between the primary and secondary ports using buffers 260, 262, 264 and 266. The output enable control signals (OECp, OECs) are internally generated by decoder 134 and control the transfer of signals between the primary and secondary ports. Each of the control signals described above, PSp__, DSp__, lSp__, R/W__p, MSTRBp__, IOSTRBp__, WEp__, and RDp__ are bi-directional and therefore have an input buffer 292 and an output buffer 291, as shown in FIG. 6. The output enable signals for the output buffers 291 for these pins are controlled by the OECp signal. When the HLDAp__ signal is low and the remote mode bit As[15] is set, then the OECp signal enables the output buffers 291 for these control signals. In this mode, signals received at the secondary port are transmitted from the primary port to processor 110. Similarly, when the HLDAs__ signal is low and the remote mode bit As[7] is set, then the OECs signal enables the corresponding secondary port control signal output buffers. The input buffers 292 are always on. When a pin is being used as an output any data received from the input buffer is ignored.

Figure 7:
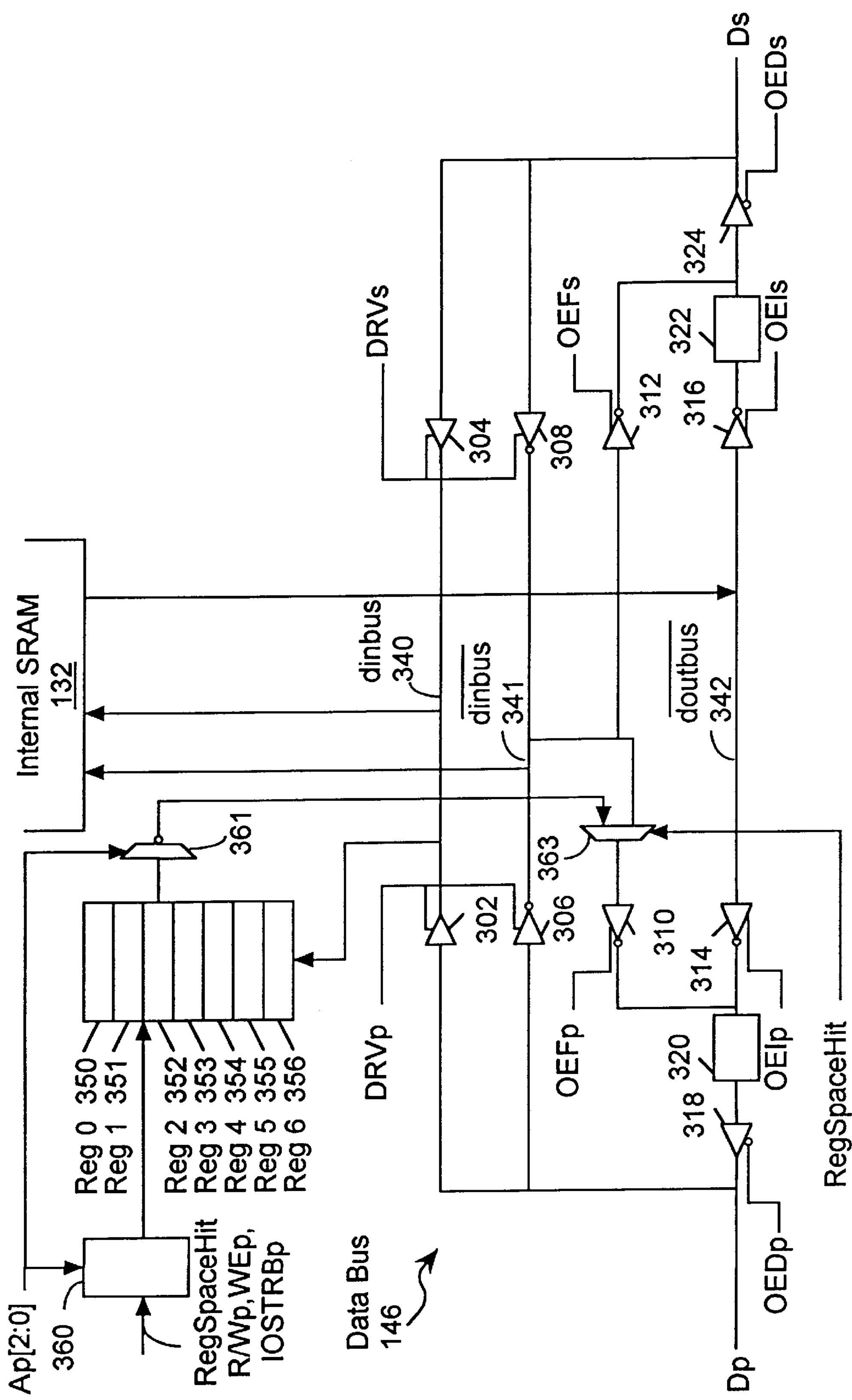
FIG. 7 illustrates the data path in a two port SRAM according to an embodiment of the present invention.

Referring to FIG. 7, there is shown a diagram of the data path in a two port SRAM. Data bus 146, illustrated in FIG. 2, is split into three buffered bus lines dinbus 340, dinbus__ 341 and doutbus__ 342. Splitting the data bus into separate buffered bus lines in this manner reduces capacitive loading and improves performance. SRAM array 132 is coupled to each of the three buffered bus lines 340–342 to provide high speed memory access. The driver control signals, DRVp and DRVs, control drivers 302 and 306 and drivers 304 and 308 respectively. The DRVP and DRVs control signals thereby control whether the primary port or secondary port is driving the internal data buses 340, 341. The DRVp signal is asserted when the HLDAp__ signal is high and R/W__p or WEp__ are low which indicates the operation is a write operation originating from the primary port. The DRVp signal is also asserted for a read operation from the primary port to the secondary port, e.g. HLDAp__ is low and R/W__ p and WEp__ are high. Similarly, the DRVs signal is asserted when the HLDAp__ signal is low and R/W__ s or WEs__ are low which indicates the operation is a write operation originating from the secondary port. The DRVs signal is also asserted when HLDAp__ is high and R/W__ s and WEs__ are high which indicates a read operation from the secondary port to the primary port. For example, in an operating mode where the primary port is in control, and the operation is a write operation from the primary port, then DRVp turns control driver 302 on, and DRVs turns control driver 304 off to avoid contention. If the operation is a read operation, then control driver 302 is turned off and control driver 304 is turned on so that data from the Ds port is propagated through to dinbus 340. Whether the output data is obtained from dinbus 340 or doutbus__ 342 is ultimately determined by the OEFp and OEIp control signals, which determine what signal is provided to keeper unit 320.

Data transferred on data bus 146 from the primary port is coupled from the data (Dp) line to buffers 302 and 306. In a data input from the primary bus mode, the drive (DRVp) signal turns on buffers 302 and 306 and the DRVs signal disables buffers 304 and 308. This causes data to be transferred from the Dp line through the dinbus 340 and an inverted signal through dinbus__ 341 to internal SRAM array 132. In a broadcast data to the secondary port mode, the output enable forward (OEFs) signal turns on buffer 312 and the output enable driver (OEDs) signal turns on buffer 324. This causes data to be transferred from the primary port to dinbus__ 341, to buffer 312, keeper 322 and buffer 324 to the secondary port. Keeper units 320 and 322 are latches to prevent the outputs from glitching.

Data from internal SRAM array 132 is transferred via doutbus__ 342 to the primary and/or secondary port. The output enable internal signals (OEIp, OEIs) control buffers 314 and 316, and thereby control which port(s) data from SRAM array 132 is coupled to. Data bus 146 thus includes a separate input bus and output bus, with the input bus further comprising a complementary pair of bus lines. OEIp is asserted when a read request for an address in SRAM array 132 is received from the primary port; when such a read request is made HLDAp__ is high and R/W__ p and WEp__ are high. Similarly, OEls is asserted when a read request for an address in SRAM array 132 is received from the secondary port; when such a read request is made HLDAp__ is low and R/W__ s and WEs__ are high.

As described above, the OEIp, OEIs, OEFp, OEFs, OEDp and OEDs control signals control the flow of data in SRAM 130. These control signals are generated by decoder 134. The OEFs control signal is asserted in a read operation (R/W__ s and WEs__ are high) where the memory access does not access internal SRAM 132 and the primary port is in a transmit mode (HLDAp__ is low). In primary remote mode, OEFs is asserted when HLDAs__ is low. In transceiver mode, OEFs is asserted when HLDAs__ is low and RWp or WEp__ are low. The OEFp control signal is asserted in a read operation (RWp and WEp__ are high) where the memory access does not access internal SRAM 132 and the primary port is tri-stated (HLDAp__ is high). In secondary remote mode, the OEFp control signal is asserted when HLDAp__ is low. In transceiver mode, the OEFp control signal is asserted when HLDAp__ is low and either R/W__ s or WEs__ are low. The OEDp control signal is asserted if either OEFp or OEIp are asserted. The OEDs control signal is asserted if either the OEFs or OEIs control signals are asserted.

SRAM 130 also has a programmable enhanced mode. In one embodiment, this mode is programmed using pull-ups and pull-downs at the As port to program registers 0–6 (350–356). The values at the As port are sampled at the rising edge of the PRGM_ signal, shown in FIG. 3. SRAM 130 is programmed in enhanced mode if the address lines As[3:0] are sampled high at the time of programming. Registers 0–6 are 16 bit registers with addresses in I/O space. The address range that define this register space is based upon the settings of the As[15:8] address lines at the time of programming. In one embodiment the register space is a 256 word space. When the address on lines Ap[15:8] match the programmed address space previously defined by address lines As[15:8], e.g. when an address in the register space is accessed, the RegSpaceHit signal is asserted to latch enable decode 360 and data are either read from or written to the addressed register based on the status of the R/W_p signal when the IOSTRBp_ is asserted and ISp_ is low. The Ap[2:0] signals control multiplexer 361, and thereby select which register to read data from. Registers 0–5 are used for decoding of chip selects and for mapping the internal memory space 132. In the enhanced mode the OEMEMp_ pin is a clock input, and the WEMEMp_ pin becomes a ready signal output. Register 6 is the ready signal generation register for the program space, data space, and I/O space sections of memory. The ready signal can be generated using either the PSp_, DSp_, or lSp_ signals as a starting strobe signal. The number of clock cycles to wait before generating a ready signal is programmable.

A further feature of the enhanced mode is that the CSMEMp_ lines are used as address lines. In one embodiment, the CSMEMp_[5:0] lines are converted to function as address lines 16 through 21. Each of the six CSMEMp_ lines has a corresponding pad on SRAM 130 with an input buffer and an output buffer, as shown in FIG. 6. The output buffers include an output enable line to switch them on and off. The control signals for the output buffers are generated by decoder 134. To use the CSMEMp_[5:0] lines as address lines the output buffers are turned off. The processor address line outputs are coupled directly to the CSMEMp_ input buffers. Address signals received on the CSMEMp_[5:0] lines are coupled to decoder 134 to determine if accesses are internal or to assert the appropriate CSMEMs_ chip select lines on the secondary port.

Address signals on the CSMEMp_[5:0] lines, corresponding to the signal lines Ap[21:16] respectively, are then used to select addresses in either internal SRAM array 132 or in an external memory coupled to the secondary port. In this mode SRAM 130 is not bi-directional in that the control signals are only received at the primary port. In an alternative embodiment, seventeen address lines Ap[16:0], and five chip select lines CSMEMp_[4:0] are used.

Figure 1:
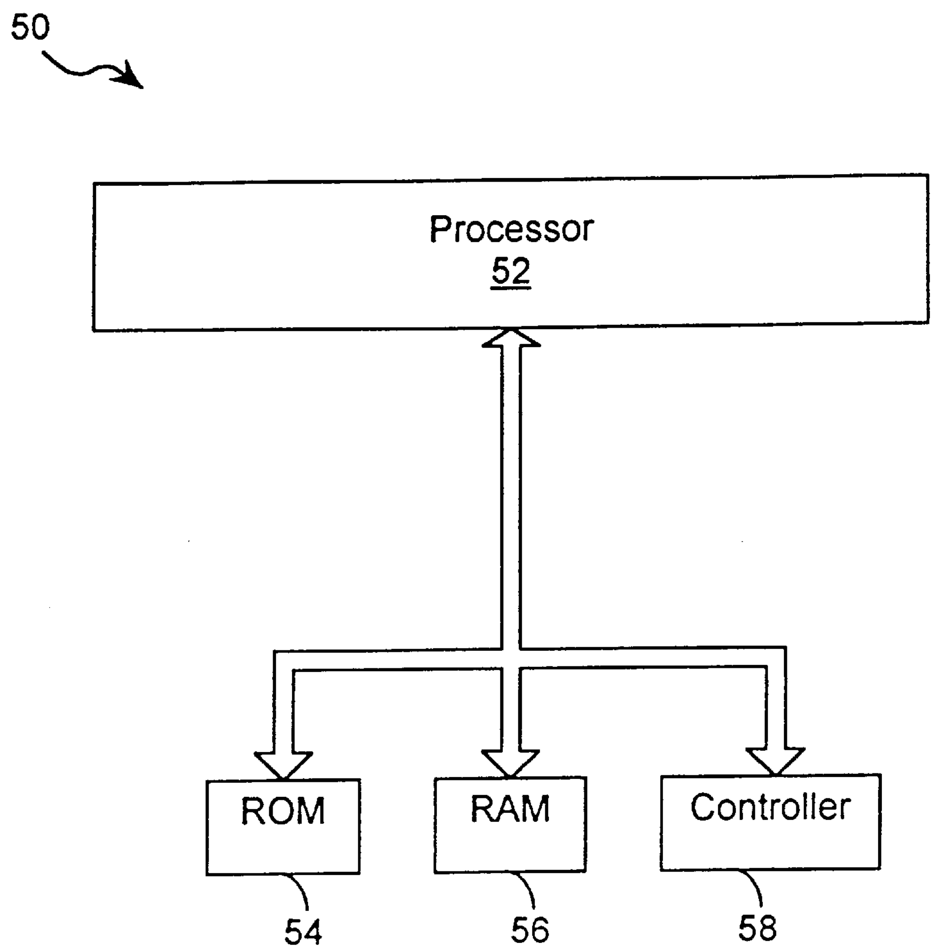
FIG. 1 illustrates a conventional computer system.

In other system configurations, more than one two port SRAM can be used in a system. The two port SRAMs can be cascaded. For example, a two port SRAM can be substituted for one or more of the local devices 116–119, shown in FIG. 1. This structure can then be repeated to create a binary tree of two port SRAMs. Cascading two port SRAMs in this manner provides more memory and keeps the bus loading low.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, a synchronous version of the two port SRAM. Also the internal SRAM array can be coupled directly to either the primary or secondary port rather than through buffers.

What is claimed is:

1. A high speed integrated circuit memory device comprising:

a primary port for receiving and transmitting address, data and control signals;

a secondary port for receiving and transmitting address, data and control signals;

a bus transceiver, coupled to the primary port and to the secondary port, the bus transceiver comprising a plurality of address lines, a plurality of data lines, and a plurality of control lines;

an internal memory array coupled to the bus transceiver, wherein within a single clock cycle the bus transceiver receives address and data signals from a receiver port of the primary and secondary ports and broadcasts the address and data signals to the internal memory array, and wherein the bus transceiver further broadcasts the address and data signals to a broadcast port of the primary and secondary ports; and a logic circuit, coupled to the plurality of address lines, the plurality of control lines, and to the internal memory array, for decoding memory control signals and for controlling transmission of data and control signals between the primary port, secondary port and internal memory array in accordance with the memory control signals;

wherein the bus transceiver further comprises: an input data bus, coupled to the primary port and the secondary port, for providing data to the internal memory array; an output data bus, coupled to the primary port and the secondary port, for retrieving data from the internal memory array; and an address and control bus, coupled to primary port and the secondary port, for transferring address and control signals between the primary and secondary port; the logic circuit including logic for controlling (A) when the primary port and secondary port are each coupled to the input data bus, (B) when the primary port and secondary port are each coulped to the output data bus, and (C) when the primary port and secondary port are each coupled to the address and control bus.

2. The device of claim 1 wherein the input data bus further comprises a primary and a complementary input data bus, each having a respective first buffer coupling the respective input data bus to the primary port and a respective second buffer coupling the respective input data bus to the secondary port.

3. The device of claim 2 wherein an output of each of the respective first and second buffers is coupled to the internal memory array.

4. The device of claim 1 wherein the logic circuit generates write and output enable signals for a standard SRAM external to the integrated circuit memory device in response to the control signals.

5. The device of claim 1 wherein in a first operational mode, as determined by the control signals, the primary port is off, and wherein in a second operational mode, as determined by the control signals, the secondary port is off.

6. The device of claim 5 wherein the control lines at the primary port further comprise a plurality of memory chip select lines; and wherein in a third operational mode, as determined by the control signals, a first plurality of the memory chip select lines operate as address input lines.

7. The device of claim 1 wherein in a fourth operational mode, in response to a predetermined state of the plurality of control signals, a first address signal of the plurality of address signals is inverted by the logic circuit so as to change a current address from corresponding to a first half of the internal memory array to corresponding to a second half of the internal memory array.

8. The device of claim 7 wherein the device further comprises a ready signal generator that generates a ready signal a predetermined number of clock cycles after receiving a strobe signal.

9. The device of claim 8 further comprising a plurality of registers for mapping the internal memory array.

10. The device of claim 9 wherein the device is an asynchronous memory.

11. The device of claim 10 wherein the internal memory array further comprises an SRAM.

12. A high speed integrated circuit memory device comprising:

a primary port for receiving address, data and control signals;

a secondary port for transmitting address, data and control signals;

a bus interface unit, coupled to the primary port and to the secondary port, the bus interface unit comprising a plurality of address lines, a plurality of data lines, and a plurality of control lines;

an internal memory array coupled to the bus interface unit, wherein within a single clock cycle the bus interface unit receives address and data signals from the primary port and broadcasts address and data signals to the internal memory array, and wherein the bus interface unit further broadcasts the address and data signals to the secondary port; and a logic circuit, coupled to the plurality of address lines, the plurality of control lines, and to the internal memory array, for decoding memory control signals and for controlling transmission of data and control signals between the primary port, secondary port and internal memory array in accordance with the memory control signals;

wherein the bus interface unit further comprises: an input data bus, coupled to the primary port and the secondary port, for providing data to the internal memory array; an output data bus, coupled to the primary port and the secondary port, for retrieving data from the internal memory array; and an address and control bus, coupled to the primary port and the secondary port, for transferring address and control signals between the primary and secondary port; the logic circuit including logic for controlling (A) when the primary port and secondary port are each coupled to the input data bus, (B) when the primary port and secondary port are each coulped to the output data bus, and (C) when the secondary port is coupled to the address and control bus.

13. The device of claim 12 wherein the input data bus further comprises a primary and a complementary input data bus, each having a respective first buffer coupling the respective input data bus to the primary port and a respective second buffer coupling the respective input data bus to the secondary port.

14. The device of claim 13 wherein an output of each of the respective first and second buffers is coupled to the internal memory array.

15. The device of claim 12 wherein the logic circuit generates write and output enable signals for a standard SRAM external to the integrated circuit memory device in response to the control signals.

16. The device of claim 12 wherein in a first operational mode, as determined by the control signals, the secondary port is off.

17. The device of claim 16 wherein the control lines at the primary port further comprise a plurality of memory chip select lines; and wherein in a second operational mode, as determined by the control signals, a first plurality of the memory chip select lines operate as address input lines.

18. The device of claim 12 wherein in a third operational mode, in response to a predetermined state of the plurality of control signals, a first address signal of the plurality of address signals is inverted by the logic circuit so as to change a current address from corresponding to a first half of the internal memory array to corresponding to a second half of the internal memory array.

19. The device of claim 18 wherein the device further comprises a ready signal generator that generates a ready signal a predetermined number of clock cycles after receiving a strobe signal.

20. The device of claim 19 further comprising a plurality of registers for mapping the internal memory array.

21. The device of claim 20 wherein the device is an asynchronous memory.

22. The device of claim 21 wherein the internal memory array further comprises an SRAM.

* * * * *